June 15, 1965  C. N. FRENCH ETAL  3,188,796
BRAKE MECHANISM
Filed Feb. 4, 1963  2 Sheets-Sheet 1
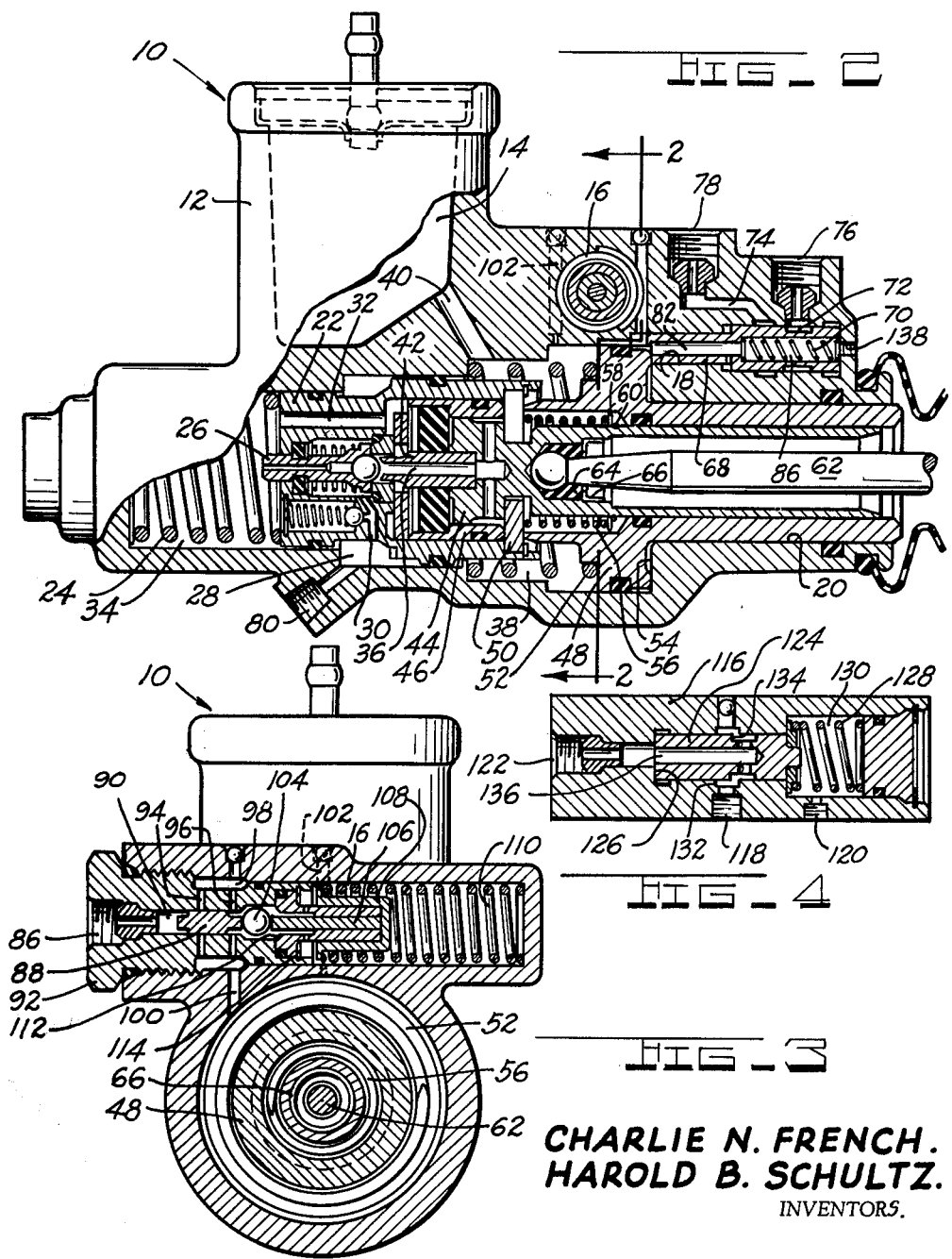
CHARLIE N. FRENCH.
HAROLD B. SCHULTZ.
INVENTORS.
BY Richard G. Gib
ATTORNEY.

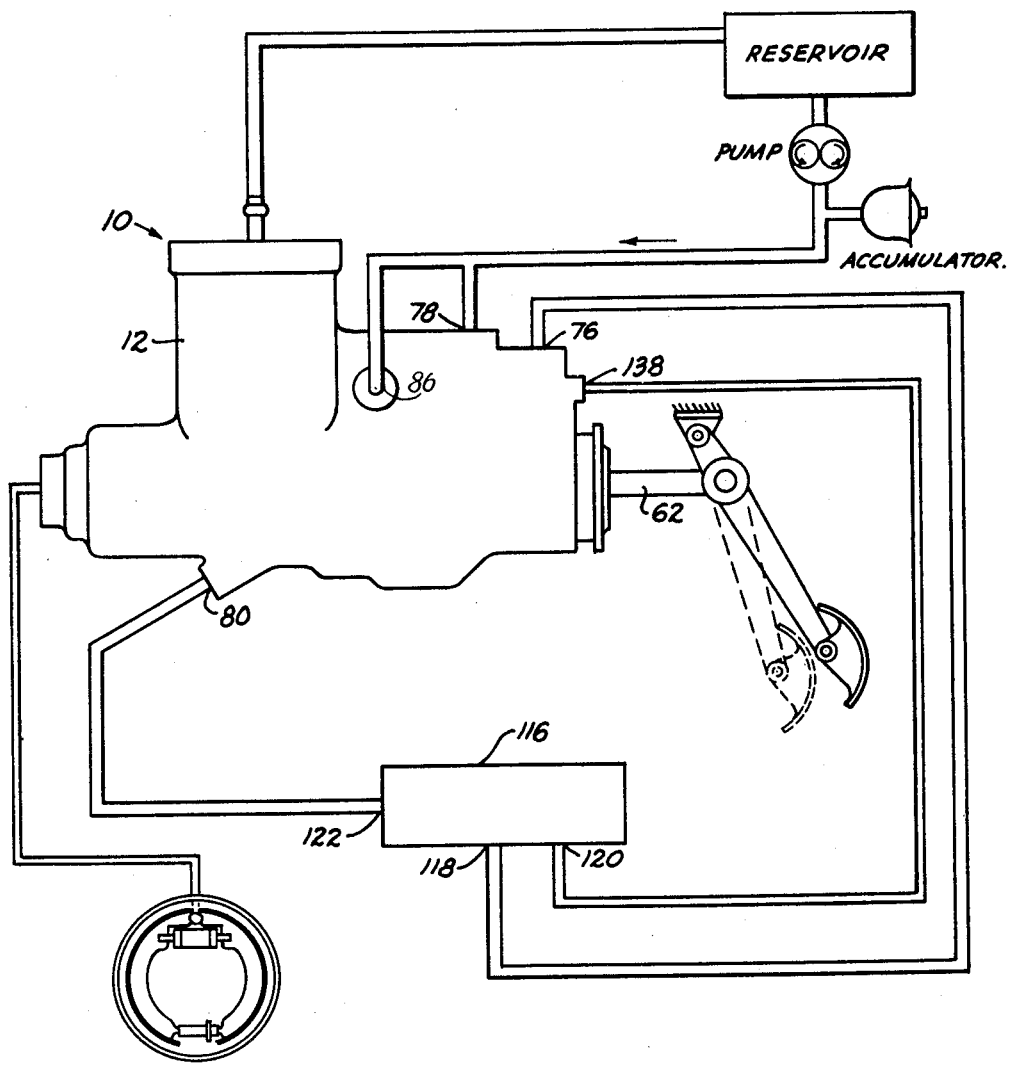
FIG_1

United States Patent Office 3,188,796
Patented June 15, 1965

3,188,796
BRAKE MECHANISM
Charlie N. French and Harold B. Schultz, South Bend, Ind., assignors to The Bendix Corporation, South Bend, Ind., a corporation of Delaware
Filed Feb. 4, 1963, Ser. No. 255,807
8 Claims. (Cl. 60—10.5)

This invention relates to a brake mechanism for power brake systems having variable stroke manually actuatable means. More particularly, this invention is concerned with means to change the maximum stroke permissable for the manually actuatable means under no-power conditions and to regulate the amount of power available during the transition from minimum stroke to maximum stroke.

With the advent of full power braking systems having variable stroke characteristics for manual and power applications, such as is disclosed by the copending United State patent application Serial No. 232,173, filed October 22, 1962 and which is incorporated herein by way of reference, there has been some concern expressed about the possibility of power application during maximum stroke operation; and that during the transition from minimum to maximum stroke for the manually actuatable member of the power brake apparatus, the pressure for the power brake apparatus is erratic in behavior.

Thus, it is the principal object of our invention to eliminate these problems.

More particularly, it is an object of our invention to provide a shut-off valve for the power brake apparatus which is responsive to the stroke capabilities of the manually actuatable member to block communication of a pressurized medium to the power brake apparatus.

It is also an object of our invention to incorporate a pressure regulating means into a variable stroke power brake apparatus to provide a constant pressurized medium for power operation of the power brake apparatus during transition from minimum to maximum stroke and vice versa.

Other and further objects of our invention will be readily apparent to those skilled in the art to which our invention relates from the following description of the accompanying drawings in which:

FIGURE 1 is a schematic full hydraulic power braking system embodying the principles of our invention;

FIGURE 2 is a broken side sectional view of a power brake apparatus incorporating an integral shut-off valve in accordance with our invention;

FIGURE 3 is a sectional end view taken along line 2—2 of FIGURE 1;

FIGURE 4 is a sectional view of a pressure regulator in accordance with the principles of our invention.

Now with particular regard to the figures, we show a power brake apparatus 10 such as would be utilized in a full hydraulic power system. It is to be understood, however, that the principles of our invention are equally applicable to other types of power systems. The power brake apparatus, as shown, consists of a housing 12 having a reservoir cavity 14, valve chambers 16 and 18 and a bored portion 20.

We have slidably mounted a piston or movable wall 22, as it may be termed, within the bore 20, which piston is biased, as by a spring 24, to the right, as viewed in FIGURE 2. The piston carries a valve 26 to control communication of an inlet chamber 28 via passages 30 and 32 with a fluid pressure intensifying chamber 34.

Chamber 34 is in communication with reservoir 14 via passages 32 and 36, a reservoir chamber 38 and a passage 40. Passage 36 is formed within a valve control member 42 abuttingly controlled by a force transmitting member 44 slidably mounted within a sleeve member 46 at the left end, as viewed in FIGURE 2. The other or right end of member 44 is slidably carried by a pressure responsive device, such as a piston 48. Between the piston 48 and the sleeve member 46 a split C washer 50 is placed, which washer holds member 46 within the piston 22 and maintains abutting contact for piston 48. Piston 48 is biased by a spring 52 to normally rest against a wall 54 of the bore 20; and the force transmitting member 44 is held against the washer 50 by a spring 56 compressed between the washer and a bearing plate 58 held on the member 44 by a retainer ring 60. In addition, a manually actuatable control rod 62 is affixed to the force transmitting member as by a rubber grommet 64 and retainer cup 66.

Within the valve chamber 18, as seen in FIGURE 2, we have mounted a slide valve 68 which is arranged to be controlled by the piston 48. More particularly, as piston 48 approaches the wall 54, it will contact the end extension of valve 68 causing it to move, assuming continued piston movement, to the right, in opposition to a spring 70 to cause a valve groove 72 to move and close off communication of a passage 74 and a port 76. This, in effect blocks the supply of pressurized fluid from port 78 via passage 74 and port 76 to inlet port 80 leading to chamber 28. A passage 82 communicates fluid pressure behind piston 48 to a spring cavity 86.

The pressurized fluid being supplied from an accumulator or pump of a fluid pressurizing system (see FIGURE 1) is also supplied to port 86, the pressurized fluid impinges on a slide valve 88 reciprocally mounted in bore 90 of an inlet port insert member 92. Adjacent the slide valve the member 92 is provided with radial passages 94 and 96, which passages communicate chamber 98 receiving fluid from passage 100 (see FIGURE 3) to either the high pressure fluid or to the reservoir chamber 38 via passage 102. A ball valve 104 is interposed with the slide valve 88 and a valve control rod 106, which control rod abuts a hat-shaped memer 108 that is biased by a spring 110 to hold the ball 104 off a valve seat 112. As seen the valve seat 112 is held by a retainer ring 114 to the insert member 92, and the valve seat is provided with a portion which fits within member 108 and which slidably mounts the control rod.

As regards the structure of FIGURE 4, a pressure regulating valve is shown having a housing 116 provided with inlet ports 118 and 120 and an outlet port 122. As seen the housing is longitudinally bored to slidably mount a slide valve spool 124, which spool is biased against a shoulder 126 of the bore by a spring 128 within a chamber 130 with which the inlet port 120 communicates. Adjacent the inlet port 118 the housing bore is grooved as at 132; and the spool 124 is grooved, as at 134, and provided with an internal passage 136 in flow communication with groove 134. Grooves 132 and 134 are arranged so that there is overlap when spool 124 is abutting shoulder 126. Thus, pressure between port 118 and port 122 is limited to a predetermined level when ball valve 104 is unseated. The overlap of grooves 132 and 134 is controlled by biasing the pressure of chamber 28 at port 122 against the spring 128 and the pressure in chamber 130, as supplied to port 120 from an outlet port 138 of spring cavity 86 via appropriate conduits or passages (not shown) depending on whether the regulating valve structure is integral with or separate from housing 12. Fluid is communicated from port 76 to port 80, or to port 118 if the pressure regulating valve is in the circuit.

In operation a high pressure fluid is applied to ports 78 and 86, unless, of course, these valve cavities are interconnected by internal passages in housing 12 where only one inlet port for the high pressure fluid is needed. The high pressure fluid acts on the slide valves 68 and 88 and 68 after passing by valve 88 downwardly through passage 100 to the chamber between wall 54 and piston 48, and causes valve 88 to exert a force on the ball 104 and in turn on the spring 110 to open communication between the inlet port 85 and passage 100 via passage 94, and chamber 98. Thus, high pressure fluid is ported behind piston 48, or to the right face thereof as viewed in FIGURE 2. When sufficient pressure has built up to overcome the effect of springs 24 and 52, piston 48 will move to the left, as seen in FIGURE 2, to cause piston 22 to move to the left and thus carry the manually actuatable control rod 62 inwardly of the power brake apparatus. As the valve control member 42 is not moved to seal on the ball valve 26, the chamber 34 is ported to the reservoir, as above mentioned, so that no brake application is experienced in the reduction of stroke from a maximum to a minimum travel for the manually actuatable control rod 62.

It should be noted at this time that regardless of the amount of travel available, piston 22 can be moved to displace fluid from chamber 34 due to the follow-through arrangement of our structure, which would allow force beyond that required to crack valve 26, to act directly on piston 22.

As accumulator system pressure begins to build up, this pressure in port 86 acts on plunger 88 through ball 104 and pin 106 to overcome spring 110. In so doing, as plunger 88 shifts to the right, it cuts off communication to reservoir and admits accumulator pressure to the cavity behind piston 48 causing the piston (and pedal position) to shift from the high, no power, position to the low, power, position. Initial downward movement of piston 48 permits valve 68, urged by spring 70, to follow to the left and admit accumulator pressure to cavity 28 for power brake application. If the pressure limiter valve (FIGURE 4) is in the circuit it will have equal accumulator pressure acting on both ends and spring 128 will hold it in the wide open position as shown.

In the event of a failure of the mechanism supplying the high pressude fluid, the pressure acting on valve 88 will fall off and the spring 110 will unseat the ball 104 to open communication of passage 96 with passage 100 and thus allow fluid to the right of piston 48 to flow to reservoir chamber 38. This relieves the opposition to springs 24 and 52, which springs aided by the remaining accumulator pressure in cavity 28 acting on the differential area of piston 22 then cause pistons 22 and 48, respectively, to move to increase the travel for the rod 62 by forcing it outwardly of the power braking apparatus, and in so doing the displaced fluid behind piston 48 will fill any void created in chamber 34.

At the same time as piston 48 returns to rest against wall 54 it abuts valve 68 causing it to shut off flow communication to the pressure regulating valve and, thus, the power brake inlet port 80. Before this occurs, however, as the pedal begins to rise, the pressure regulating valve functions and limits available power braking pressure to a desired maximum. Since cavity 130 is now vented to reservoir in that passage 82 is open to passage 100 communicated with chamber 16 through the open valve seat 112, thence into passage 102 to chamber 38 and out passage 40 to the reservoir 14, pressure communicated from port 78 past the lands of valve 68 and valve 124 act on the left end of valve 124 to oppose spring 128 to limit pressure available at cavity 28 as desired. When the piston 48 abuts wall 54, valve 68 has been shifted to the right by piston 48 and all pressure communication to cavity 28 has been cut off until system pressure has again been built up. Therefore, one is not only assured that with increased travel available for a manually actuatable brake apparatus there will be no chance of power application, but that during the transition from minimum to maximum travel capabilities one need not fear excessive pressure.

Thus, it is believed that the above structure clearly accomplishes the objects of our invention as set forth as well as other objects and advantages apparent to those skilled in the art to which our invention relates which may be gleamed by their study of this descriptive embodiment. We, however, cannot overemphasize that the foregoing description is but one structural arrangement of many which may be utilized in accomplishing these, our principles. Therefore, we do not intend to be limited by this structure but rather by the scope of the appended claims.

We claim:

1. For use with a manually actuatable control adapted to operate a pressure producing apparatus having a fluid pressure source, a fluid pressure motor in communication with the fluid pressure source, the motor including a pressure responsive device dividing a portion of the fluid pressure motor into opposing fluid pressure chambers with the pressure responsive device connected to the manually actuatable control to move the control between a normal low position and an emergency high position, and means communicating a pressurized fluid to one of the opposing chambers and automatically controlling the differential pressure between the opposing chambers in such manner as to hold the manually actuatable control in the low position when the pressurized fluid is being supplied and to raise the manually actuatable control to the high position when said pressurized fluid supply falls off, a means to sense the falling off of the fluid pressure source and control the fluid pressure source's communication with said fluid pressure motor which means comprises:

a slide valve responsive to said pressure responsive device;

a means communicating the fluid pressure source to said slide valve; and a resilient member operatively arranged to normally bias said slide valve to normally communicate said fluid pressure source to said fluid pressure motor which resilient means is adapted to oppose said pressure responsive device when said pressure responsive device moves in a direction to cause said slide valve to terminate such communication.

2. A power brake apparatus comprising:

a housing having a stepped chamber therein;

a manually controlled brake valve and pressure intensifying means having a stepped cross-sectional profile and reciprocally mounted in said stepped chamber of said housing;

a pressure responsive device subjected to a high pressure fluid including a piston reciprocally arranged in said stepped chamber behind said means to divide the chamber behind said means into a first and second variable volume chamber and a first valve means controlled by the high pressure fluid for communicating said first and second chambers when said high pressure fluid fails to overcome a spring biasing said first valve to prevent communication, said piston being operatively connected to said manually controlled brake valve and pressure intensifying means and of a larger effective area than said means so that when exposed to an equivalent pressure differential the piston controls the means and when said spring biased valve means destroys any differential across said piston the pressure intensifying means controls said piston;

a second valve means responsive to the position of said piston to trap pressurized fluid between one of said variable volume chambers and said manually controlled brake valve and pressure intensifying means when said variable volume chambers are communicated to destroy any pressure differential across said piston and allow said means to control said piston; and spring means biased between said housing and said piston to aid said means upon a decrease in pressure differential across said piston in moving said piston whereby said manually controlled brake valve and pressure intensifying means is moved to increase travel permissible in operating same.

3. A power brake apparatus according to claim 2 wherein said second valve means includes a pressure regulator to prevent bleeding of the trapped pressure during a change in pressure differential across said piston.

4. A means to sense the falling off of a pressurized fluid source and control a fluid pressure source's communication with a fluid pressure motor in accordance with claim 1 and further comprising a means connected to said means communicating said fluid pressure motor to said slide valve to limit the pressure of said fluid pressure source as supplied to said fluid pressure motor.

5. A power braking apparatus comprising:
   a manually actuatable member;
   a power brake valve control member operatively connected to said manually actuatable member;
   a movable wall coaxially arranged with respect to said manually actuatable member and said power brake valve control member, said movable wall being operatively connected to said manually actuatable member and said power brake valve control member to bias said manually actuatable member in one direction;
   a pressure responsive device operatively connected to said manually actuatable member;
   a means to supply pressurized fluid to the power brake valve control member and to said pressure responsive device to cause said pressure responsive device to overcome said movable wall and move said manually actuatable member in a direction opposite that urged by said movable wall; and
   a valve means interposed with said means supplying a pressurized fluid to said power brake valve control member and to said pressure responsive device, which valve means is operatively connected to said pressure responsive device to shut off the supply of fluid to said power brake valve control member when said pressure responsive device is moved by said movable wall moving said manually actuatable member in said one direction.

6. A power braking apparatus according to claim 5 and further comprising a pressure regulating valve connected to said valve means to limit the pressure of the fluid supplied to be controlled by said power brake valve control member as system pressure drops to approach runout.

7. In a power brake apparatus having a housing and a manually controlled brake valve and pressure intensifying means therein, a means for varying the travel capabilities of the manual control comprising:
   a pressure responsive device subjected to a high pressure fluid, said pressure responsive device including a piston dividing a portion of said housing into a first and a second variable volume chamber and a spring biased valve means controlled by the high pressure fluid for communicating said first and second chambers when said high pressure fluid fails to overcome said spring, said piston being operatively connected to both the pressure intensifying means and the manual control;
   a second valve means responsive to the position of said piston to control communication of the high pressure fluid to the brake valve; and
   spring means to oppose the effect of the high pressure fluid on said piston such that upon failure of said high pressure fluid said piston will increase the travel available to the manual control.

8. A power brake apparatus according to claim 7 and further characterized as comprising a pressure regulating valve interposed with said second valve means and the brake valve to limit the pressure of the high pressure fluid supplied to the brake valve to a preselected level as system pressure drops to approach runout.

References Cited by the Examiner

UNITED STATES PATENTS

| 2,706,020 | 4/55 | Freers et al. | 91—391 |
| 3,031,849 | 5/62 | Price et al. | 60—54.5 |
| 3,063,427 | 11/62 | Hill | 91—391 |

FRED E. ENGELTHALER, *Primary Examiner.*

SAMUEL LEVINE, *Examiner.*